June 4, 1929.   W. B. RAYTON   1,715,784
OPHTHALMIC LENS AND METHOD OF MAKING THE SAME
Filed Jan. 21, 1927
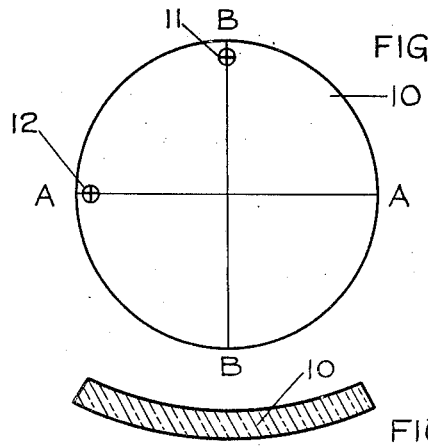
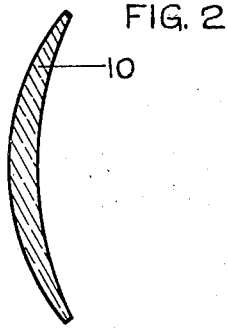
FIG. 4
| SPH. D+ \ CYL. D + | 1.00 | 1.25 | 1.50 | 1.75 |
|---|---|---|---|---|
| 3.00 | 64.43 / 57.55 | | | |
| 2.50 | | 64.43 / 56.14 | 64.43 / 54.75 | 64.43 / 53.39 |
| 2.00 | | | | 64.43 / 53.39 |
| 1.50 | | | | 64.43 / 53.39 |
| 1.00 | 74.27 / 65.13 | | | 64.43 / 53.39 |
| + 0.50 | | 74.27 / 63.13 | 74.27 / 61.60 | 74.27 / 59.90 |
| 0.00 | | | | |
| − 0.50 | 79.60 / 69.27 | 79.60 / 67.15 | 79.60 / 65.13 | 79.60 / 63.13 |
| 1.00 | | | | |
| 1.50 | | | | |
| 2.00 | | | | |
| 2.50 | | | | |
| 3.00 | | | | |
| 3.50 | | | | |
| 4.00 | | | | |
| 4.50 | 93.94 / 79.79 | | | |
| 5.00 | | | | |
INVENTOR
WILBUR B. RAYTON
BY
his ATTORNEYS Patented June 4, 1929.

1,715,784

UNITED STATES PATENT OFFICE.

WILBUR B. RAYTON, OF ROCHESTER, NEW YORK, ASSIGNOR TO BAUSCH & LOMB OPTICAL COMPANY, OF ROCHESTER, NEW YORK, A CORPORATION OF NEW YORK.

OPHTHALMIC LENS AND METHOD OF MAKING THE SAME.

Application filed January 21, 1927. Serial No. 162,623.

This invention relates to improvements in ophthalmic lenses which are intended to correct astigmatic errors of the eye or combinations of astigmatic and focal errors. More particularly, it has reference to an ophthalmic lens which is corrected for marginal astigmatism and has one of its surfaces of toric form.

One of the most important objects of the present invention is to produce a system of ophthalmic lenses corrected for marginal astigmatism, and having toric surfaces which are characterized by basic curves which are common for lenses of several powers whereby a jobbing optician can dispense lenses of any desired power from a minimum number of semi-finished stock blanks, thereby lessening the cost of such lenses and facilitating their manufacture.

Another object is to produce a group of ophthalmic lenses consisting of several proximate series of lenses of respectively varying powers, wherein each lens presents a toric surface on one side, the rotational curve of said surface being common to the entire group while the cross curve is common to a single series of said group, each lens in the group being corrected for marginal astigmatism.

Another object is to facilitate the manufacture of ophthalmic lenses, which are corrected for marginal astigmatism, by establishing a curve or curves of a toric surface, which are common to several lenses of different powers.

Other objects and advantages reside in certain novel features of construction, arrangement and combination of parts, and in the method of making the same, which will hereinafter be more fully described and pointed out in the appended claims.

Referring to the drawings:

Fig. 1 is a front view of a lens.

Fig. 2 is a vertical sectional view of the lens of Fig. 1.

Fig. 3 is a horizontal sectional view of the lens of Fig. 1.

Fig. 4 is a portion of a lay-out chart showing the grouping of lenses according to my invention.

Lenses which are designed to correct the astigmatic errors of the eye or combinations of astigmatic and focal errors, are known as compound lenses inasmuch as they have different powers in different meridians. Of all the different powers of such a lens there will be found one which is a minimum and one which is a maximum and these powers will be found to lie in two meridians which are perpendicular to each other. The powers of such a lens may be completely stated by giving the minimum and maximum powers, such as, for example, +4.00 D and +5.00 D, wherein D is the universally recognized symbol for dioptry, the unit of power, or they may be stated by giving the minimum or the maximum power and the difference between the two principal powers in which case the first of these values is known as the sphere and the second, the cylinder. Thus, the lens specified above may be written +4.00 D sph. ◯ +1.00 D cyl. or +5.00 D sph. ◯ −1.00 D cyl. The difference between the two principal powers is known as the astigmatic difference, or it may also be designated as the amount of cylinder.

Such lenses are usually made at the present time in a form which requires that at least one of the surfaces becomes a portion of a torus and the lens for this reason is known as a toric lens. The weaker of the two principal curves on the toric surface is usually called the rotation curve and the stronger one the cross curve for reasons connected with the process of manufacture.

Nearly all toric lenses have been made with the toric surface on the front side of the lens and its form has been in general that of a convex surface. The rear surface has been ground with a concave spherical surface whose curvature was so chosen that in combination with the front toric surface the powers required of the lens were realized. Until comparatively recent times toric lenses have been made with but a single rotation curve regardless of the powers of the lens, and, in fact, that curve has been almost universally a +6.00 D. This constant rotation curve of the toric surface has been universally called the base curve.

Concave toric surfaces are also known to the art and here, too, the weaker curve is generally the rotation curve and is known as the base curve.

Such lenses serve very well for the correction of the eye so long as the line of sight does not depart greatly from the axis of symmetry of the lens, but it is known that, as the eyeball rotates in its socket and the line of sight makes angles of considerable size with the axis of the lens, the correction afforded by the lens is not that given by it when the line of sight coincides with the axis.

Von Rohr has shown in U. S. Patent 989,645, of April 18, 1911, that it is possible to choose the curvature of a toric lens in such a manner as to very much reduce the aberrations in the margin of the field of view afforded by the lens. He states there that the best average correction is given by the marginal zone when the lens is so shaped that the difference between the two powers at a point in one of the principal meridians of the lens is equal to the difference in the two powers found at the corresponding point in the other principal meridian. By corresponding points is meant points such that lines drawn from them to the point about which the eyeball rotates form equal angles with the axis of the lens.

It is known that the performance of a spectacle lens in respect to the above condition depends not only on the curvatures of its surface but also on its distance from the center of rotation of the eyeball. This distance, in practice, is found to lie between 2.5 cm. and 3 cm. from the vertex of the rear surface of the lens, and consequently, this value is to be understood to apply throughout the following discussion.

It has been found, furthermore, that a spectacle lens gives complete satisfaction when it provides substantially uniform correction for the eye within an angular field of view of 60° corresponding to an extreme angle of 30° between the line of sight and the axis of the lens.

All lenses hitherto described, corrected as defined above, viz, for a total angle of vision of 60°, for a distance from lens to center of rotation of the eye of 2.5 to 3.0 cm., and so that for corresponding points in the two principal meridians the same amount of cylinder is realized, have differed from power to power over the whole range of powers required, in respect to the toric surfaces employed. There has been no base curve used in the accepted sense of the term, viz, as meaning the rotation curve of the toric surface. This has made the production of such lenses a very expensive matter and has made it impossible for the optician to follow the practice, current in dispensing ordinary toric lenses, of carrying a stock of blanks whose toric surfaces are finished and which requires only the finishing of the sperical surface by the optician; a process which he can carry out much more satisfactorily in respect to quality of workmanship and cost than he can the production of a toric surface.

Figure 1 shows a diagrammatic face view of a toric lens 10, with lines A—A and B—B denoting the two principal meridians which are perpendicular to each other. As can be readily seen from Figs. 2 and 3, the curvature along the vertical meridian is greater than that along the horizontal meridian. By reason of the process involved in the manufacture of a toric surface, the stronger of the two curves is known as the cross curve whereas the weaker of the two curves is designated as the rotation curve. Although in the lens shown in the drawings, the rotation and cross curves are in the horizontal and vertical meridians, respectively, their location is entirely immaterial in so far as the invention is concerned.

Two places in the marginal zone of the lens are located respectively, in the two principal meridians as indicated at 11 and 12 in Figure 1. I also refer to places 11 and 12 as being "corresponding points," meaning thereby, as stated above in connection with the von Rohr patent, that lines drawn from these points to the center of rotation of the eyeball will form equal angles with the axis of the lens.

My experiments have shown that even if equality of performance is obtained at corresponding points, as described in the von Rohr patent mentioned above, vision in the marginal field still lacks the perfection obtained in the center of the field because of disturbances due to chromatic aberration and coma which reduce the sharpness of the image in the margin. For this reason, I have found that it is unnecessary and unprofitable to strive for the condition of absolute equality of performance at two corresponding points and that the resulting vision will be just as good if the departure from this condition does not amount to more than 5% of the arithmetical sum of the sphere and cylinder. Thus, in Figure 1, I find that satisfactory marginal vision is obtained when the astigmatic difference at point 11 does not vary from the astigmatic difference at point 12 by an amount that exceeds 5% of the arithmetical sum of the spherical and cylindrical values of the lens.

With this limitation, I have found it possible to design lenses such that the same rotation curve can be used for a group of lenses of different powers. Each of such groups of lenses comprises a plurality of proximate series of lenses of respectively varying powers and each series has a cross curve which is common to that series only.

In Fig. 4, I have shown a portion of a lay-out chart 13 which illustrates my novel arrangement and grouping of lenses. The vertical column 14 at the left of the chart indicates, in diopters, the spherical values of a lens, while the horizontal row 15 at the top of the chart indicates in diopters, the cylindrical values that may be combined with the spherical values to produce the desired lens. This chart is merely illustrative and it is to be understood that similar lay-out charts are used for other combinations and powers of lenses covering the entire system or range of powers of ophthalmic lenses.

Heavy lines, 16, 17, 18, and 19, on Fig. 4, indicate the limits or boundaries of the lens groups. The rotation and cross curves are given in spaces 20 of the chart, opposite each lens power and combination. In each instance, the number in the upper half of the space denotes the rotation curve, as shown at 21, while the cross curve is denoted by the number in the lower half of the space, as at 22. For the sake of convenience, the numbers are not repeated in each space, excepting in the upper portion of the extreme right hand column, which indicates that the rotation and cross curve values at the heads of the columns hold true for the vertical series within each group.

The numbers in the spaces, shown in Fig. 4, denote the radii of curvatures, in millimeters, of the rotation and cross curves. These computations are made according to lens formulas which are well known to persons skilled in the art and so are not included in the specification.

My novel arrangement and grouping of lenses is clearly shown in Fig. 4. The heavy lines 16, 17, 18, and 19, indicate the boundaries or limits of the various groups of lenses. Each of the respective groups is characterized by a basic rotation curve which is common for each lens of the entire group. Each group, in turn, comprises a plurality of proximate series of lenses of respectively varying powers and each respective series of the group has a cross curve which is common only to one series.

Thus lines 16 and 17 mark the limits of a group of lenses, all of which have a common rotation curve whose radius of curvature is 64.43 millimeters. As shown in Fig. 4, this group comprises four proximate series of lenses, each series having a common cross curve. Thus the first series has a cross curve whose radius is 57.55 millimeters, the second series a cross curve whose radius is 56.14 millimeters and so on.

For example, by using a rotation curve of 79.60 mm. and a cross curve of 69.27 mm. a toric surface is created which can be used for all lenses between the limits of −0.50 D sph. ◯ +1.00 D cyl. and −4.00 D sph. ◯ + 1.00 D cyl. For an angle of 30° between the line of sight and the optical axis of the lens the amounts of cylinder realized in the first of these are 1.08 D in the meridian whose power is −0.50 D, and 1.03 D in the meridian whose power is +0.50 D. For the second case, the results are 0.98 D in the −4.00 D meridian and 1.12 D in the −3.00 D meridian. The departures from the condition of equality of cylinder are 0.05 D and 0.14 D in the first and second cases respectively. These values correspond to 3.3% and 2.8% of the arithmetical sum of the amounts of sphere and cylinder.

The correction of intermediate powers lies between that of these limiting cases passing through zero inasmuch as one of the above corrections is opposite in sign to the other. All these lenses then from −0.50 D sph. to −4.00 D sph. combined with a +1.00 D cyl. can be made with the same toric surface whose curvatures are 79.60 mm. and 69.27 mm.

Although the examples given above and the chart of Fig. 4 relate to toric surfaces on the convex side of the lens, my invention is equally applicable to a lens having the toric surface on the concave side. Thus for another example, not shown on the chart, we may take the range from +2.00 ◯ +0.25 D to +5.00 D ◯ +0.25 D. By using a toric surface whose rotation curve radius is −75.70 mm. and whose cross curve radius is −73.10 mm., all lenses between these limits may be ground with the same toric surface on the concave side of the lens. The cylinders obtained are in the first case, 0.27 D in the meridian of +2.00 D and 0.25 D in the +2.25 D meridian, and for the second case, 0.25 D in the +5.00 D meridian and 0.27 D in the +5.25 D meridian. Both of these cases meet the required condition which I have established, within 1% of the arithmetical sum of the sphere and cylinder values. Intermediate powers are equally well or better corrected.

By choosing a sufficiently large number of different rotation and cross curves, I am able to produce an ophthalmic lens system covering the entire range of spectacle lens powers and combinations, while providing the marginal correction of the character described above, and still keeping the number of semi-finished toric blanks at a minimum so that they are not too numerous for the optician to carry in stock.

I do not claim the invention of lenses corrected for marginal errors, nor do I claim the use of a base curve common to several powers. The use of a common base curve, with respect to a marginally corrected lens, has been confined, however, to the employment of a common spherical surface, which while it permits satisfactory correction of the lens, fails to enable the dispensing optician to give his customers prompt service unless he grinds the toric surfaces. As stated above, the dispensing optician is able to finish the spherical surface of the lens much more satisfactorily, as regards quality of workmanship and cost, than he can produce a toric surface. My invention, however, will make it possible for the dispensing optician to produce a marginally corrected lens by grinding a spherical surface on one side of a semi-finished toric blank which he selects from a minimum number of stock blanks.

From the foregoing description it will be noted that I am able to attain the objects of my invention and facilitate the production of marginally corrected ophthalmic lenses, having toric surfaces, by establishing basic rotation and cross curves. It is to be understood that the foregoing description and accompanying drawings are to be interpreted as illustrative only and not in any limiting sense.

I claim as my invention:

1. A system of ophthalmic lenses comprising several groups of lenses of different powers, each group comprising a plurality of proximate series of lenses of respectively varying sphero powers wherein each lens presents on one side a toric surface having a basic rotation curve which is constant only for a single group and a basic cross curve which is constant only for a single series, the other side of each lens presenting a spherical surface which is variable according to the desired prescriptive powers, the astigmatic difference at one place in a marginal zone of each lens being equal to the astigmatic difference at another place in said zone within a predetermined limit.

2. A group of ophthalmic lenses of several powers comprising a plurality of proximate series of lenses of respectively varying sphero powers wherein each lens presents on one side a toric surface having a basic rotation curve which is constant for the group and a basic cross curve which is constant for a given series but which varies with each respective series, the other side of each lens presenting a spherical surface which is variable to produce the powers required by prescription, the astigmatic difference at one place in the marginal zone of each lens being equal to the astigmatic difference at another place in said marginal zone within a predetermined limit.

3. A group of ophthalmic lenses of several powers comprising a plurality of proximate series of lenses of respectively varying sphero powers wherein each lens presents on one side a toric surface having a basic rotation curve which is constant for the group and a basic cross curve which is constant for a given series but which varies with each respective series, the other side of each lens presenting a spherical surface which is variable to produce the powers required by prescription, the astigmatic difference at one place in the marginal zone of each lens being equal to the astigmatic difference at another place in said marginal zone within a predetermined limit which is defined substantially as 5% of the arithmetical sum of the spherical and cylindrical values of each respective lens.

4. An ophthalmic lens having on one side a toric surface whose rotation curve is common to a number of lenses of different powers and whose cross curve is common for a lesser number of lenses of different powers, the other side of said lens presenting a spherical surface which is variable according to individual prescription, the amount of cylinder at one place in the marginal zone of the lens being equal to the amount of cylinder at another place in said marginal zone within a predetermined limit.

5. The process of manufacturing an ophthalmic lens which comprises determining a basic rotation curve of a toric surface, said curve being constant for a group of lenses of different powers, determining a basic cross curve of a toric surface, said cross curve being constant for one of several series of lenses which comprise said group, grinding a toric surface on one side of a lens blank in accordance with said basic curves and grinding a spherical curve on the other side of said lens blank while maintaining the equality in the amounts of cylinder of two corresponding points in the marginal zone of the lens within a limit which is defined as substantially 5% of the arithmetical sum of the spherical and cylindrical values of the lens.

6. The process of manufacturing an ophthalmic lens which consists in selecting a group of lenses which comprises proximate series of lenses of respectively varying powers, determining a toric surface by selecting a basic rotation curve which is constant for said group and a basic cross curve which is constant only for a single series of lenses of said group, grinding a toric surface on one side of a lens blank in accordance with said basic curves and grinding a spherical surface on the other side of said lens blank to obtain a desired prescriptive power while maintaining the marginal astigmatic error within a predetermined tolerance.

7. The process of manufacturing an ophthalmic lens which consists in establishing a group of lenses which comprises proximate series of lenses of respectively varying sphero powers, determining a toric surface by selecting a basic rotation curve which is constant for said group and a basic cross curve which is constant only for a single series of lenses of said group, grinding a toric surface on one side of a lens blank in accordance with said basic curves and grinding a spherical surface on the other side of said lens blank to obtain a desired prescriptive power while maintaining the equality in the amounts of cylinder of two corresponding points in the marginal zone of the lens within a limit which is defined as substantially 5% of the arithmetical sum of the spherical and cylindrical values of the finished lens.

WILBUR B. RAYTON.